UNITED STATES PATENT OFFICE.

HERMANN GOLDENBERG, OF WIESBADEN, GERMANY.

IMPROVEMENT IN THE MANUFACTURE OF TARTARIC ACID.

Specification forming part of Letters Patent No. 221,297, dated November 4, 1879; application filed April 8, 1879.

*To all whom it may concern:*

Be it known that I, HERMANN GOLDENBERG, of Wiesbaden, in the Empire of Germany, have invented a certain new and Improved Process of Recovering the Potassium of Tartar in the Manufacture of Tartaric Acid, of which the following is a specification.

This invention has for its object a new method of recovering the potassium of the tartar in the form of hydrate of potassa in the manufacture of tartaric acid.

In the conversion of tartar into tartaric-acid lime or tartrate of lime by the present well-known methods, the potassium of the tartar remains behind as a solution of chloride of potassium, the transformation of which into a solid substance is not profitable.

If about one hundred and eighty-eight parts of tartar and ten parts water, together with one hundred and twelve parts of caustic lime, are heated by steam for several hours in a closed vessel under pressure of about three atmospheres, at about 100° centigrade, the tartar is converted into tartrate of lime, and then into lye of potassa upon the whole being stirred when cooling. More than 100° centigrade prevents a partial reformation of neutral tartrate of potassium, which is not worth naming at 100° centigrade.

By this process the sticky glutinous mass is rendered capable of being filtered, and a separation takes place at a temperature of about 100° centigrade.

A second method in common use is the following: Tartar is neutralized with chalk or milk of lime, and the tartrate of lime formed is filtered off. The solution of neutral tartrate of potassium is stirred and poured into milk of lime of about 15° Baumé, at normal temperature, the proportions being as follows: One molecular part, in weight, of neutral tartrate; one molecular part, in weight, of potassium; two molecular parts, in weight, of hydrate of potash, and ten times the quantity of water.

The transformation into tartrate of lime and lye of potassa is complete. To render the mass capable of being filtered, however, the same has to be heated for about two hours under a pressure of one atmosphere. The product is cooled down, as in the first method, whereby the greater portion of the tartrate of lime is left as an insoluble basic salt, and is filtered off cold. The filtered liquid, which contains all the potassium as hydrate of potash, is heated to about 100° centigrade, at which temperature it is filtered in order to remove any trace of tartrate of lime which it may still contain.

The basic salt is used to neutralize a fresh quantity of tartar, whereby the lime is not lost, but is returned into use.

In the above-described methods heretofore employed a lye of potassa has been obtained in which tartrate of lime as a basic salt was gelatinously suspended.

In order to render the product of reaction capable of being filtered, it has been necessary to boil the same under pressure, and to cool the mass to prevent the reformation which would otherwise take place. Now, however, I have discovered a proportion which can be worked cold in open vessels, and yields a mass which may be readily filtered.

If I take two hundred and twenty-six parts, by weight, neutralized tartrate of potassium, with eight times as much water, and one hundred and twelve parts, by weight, of quicklime slaked in sixteen times the quantity of water, and pour a solution of neutralized tartrate of potassium into the above-named mixture at a normal temperature while stirring the same, the greater portion of the tartrate of lime with two atoms of lime in the molecule is precipitated in an insoluble powdered mass which is capable of being filtered, leaving the lye of potassa.

The lime-salts are filtered off, and the small quantity of tartrate of potassium still in solution can be separated from the lye of potassa, in the shape of small flakes, by heat.

The above-described operation is very simple, and can be effected in a short time without the use of complicated apparatus.

In carrying this process into effect success depends chiefly on the quantities employed, and in following the order of operation.

By this process alumina, which is so detrimental in the manufacture of tartaric acid, is removed, the same being held in solution in the lye of potassa.

Tartrate of lime is soluble in cold hydrate of potash, but by heat it would be separated as a gelatinous product, which cannot be filtered. The use of the salt capable of being filtered and insoluble in cold hydrate of potash is very important, as it permits the above-described process to be employed.

What I claim as my invention, and desire to secure by Letters Patent, is—

The process herein described of recovering the potassium of tartar in the manufacture of tartaric acid, consisting in, first, mixing neutralized tartrate of potassium and water with slaked quicklime in about the proportions and in the manner herein specified, and afterward pouring into the mixture, while stirring the same, a solution of neutralized tartrate of potassium, substantially as herein specified.

In testimony that I claim the foregoing I have hereunto set my hand this 28th day of January, 1879.

DR. HERMANN GOLDENBERG.

Witnesses:
 FRANZ WIRTH,
 FRANZ HASSLACHER.